(12) United States Patent
Hsu et al.

(10) Patent No.: US 8,519,904 B2
(45) Date of Patent: Aug. 27, 2013

(54) KEYBOARD STRUCTURE WITH ANTENNA FUNCTION

(75) Inventors: Jun-Ting Hsu, Taoyuan County (TW); Yih-Ming Yang, Taipei (TW); Ming-Fu Yen, Taipei County (TW); Hsi-Wang Lee, Taipei County (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 175 days.

(21) Appl. No.: 12/953,620

(22) Filed: Nov. 24, 2010

(65) Prior Publication Data

US 2012/0075189 A1     Mar. 29, 2012

(30) Foreign Application Priority Data

Sep. 27, 2010    (CN) .......................... 2010 1 0292693

(51) Int. Cl.
*H01Q 1/48*     (2006.01)
(52) U.S. Cl.
USPC .......................... 343/845; 345/169

(58) Field of Classification Search
USPC .................................................. 345/168–169
See application file for complete search history.

(56) References Cited

U.S. PATENT DOCUMENTS

| | | | | |
|---|---|---|---|---|
| 6,954,181 | B2 * | 10/2005 | Park et al. ..................... | 343/702 |
| 7,388,547 | B2 * | 6/2008 | Lee ................................ | 343/702 |
| 8,124,926 | B2 * | 2/2012 | Ishida ....................... | 250/227.14 |

* cited by examiner

*Primary Examiner* — Duc Dinh
(74) *Attorney, Agent, or Firm* — Li&Cai Intellectual Property (USA) Office (57) ABSTRACT

A keyboard structure with antenna function includes a keyboard unit and an antenna unit. The keyboard unit includes a keyboard signal circuit board, at least one keyboard frame disposed on the keyboard signal circuit board, and a plurality of pressing elements passing through the keyboard frame and movably disposed on the keyboard signal circuit board. The antenna unit includes at least one metal circuit disposed on the keyboard frame. Thus, the length of a signal transmission line between the metal circuit and a wireless antenna module can be substantially reduced. Therefore, not only the insertion loss of the instant disclosure can be reduced to obtain better quality of wireless communication, but also the manufacturing cost and time of the instant disclosure also can be reduced effectively.

8 Claims, 13 Drawing Sheets

KEYBOARD STRUCTURE WITH ANTENNA FUNCTION

BACKGROUND OF THE INVENTION

1. Field of the Invention

The instant disclosure relates to a keyboard structure, and more particularly, to a keyboard structure with antenna function.

2. Description of Related Art

In wireless communication systems, such as a notebook computer or a mobile phone, an antenna is a device for transmitting and receiving electromagnetic waves. The way that an antenna is designed and the location that it is mounted in the system influences its radiation field pattern, and the quality of signal transmission. Furthermore, how the antenna is configured in the system will have a great effect on the cost of manufacturing the whole system.

Figure 1:
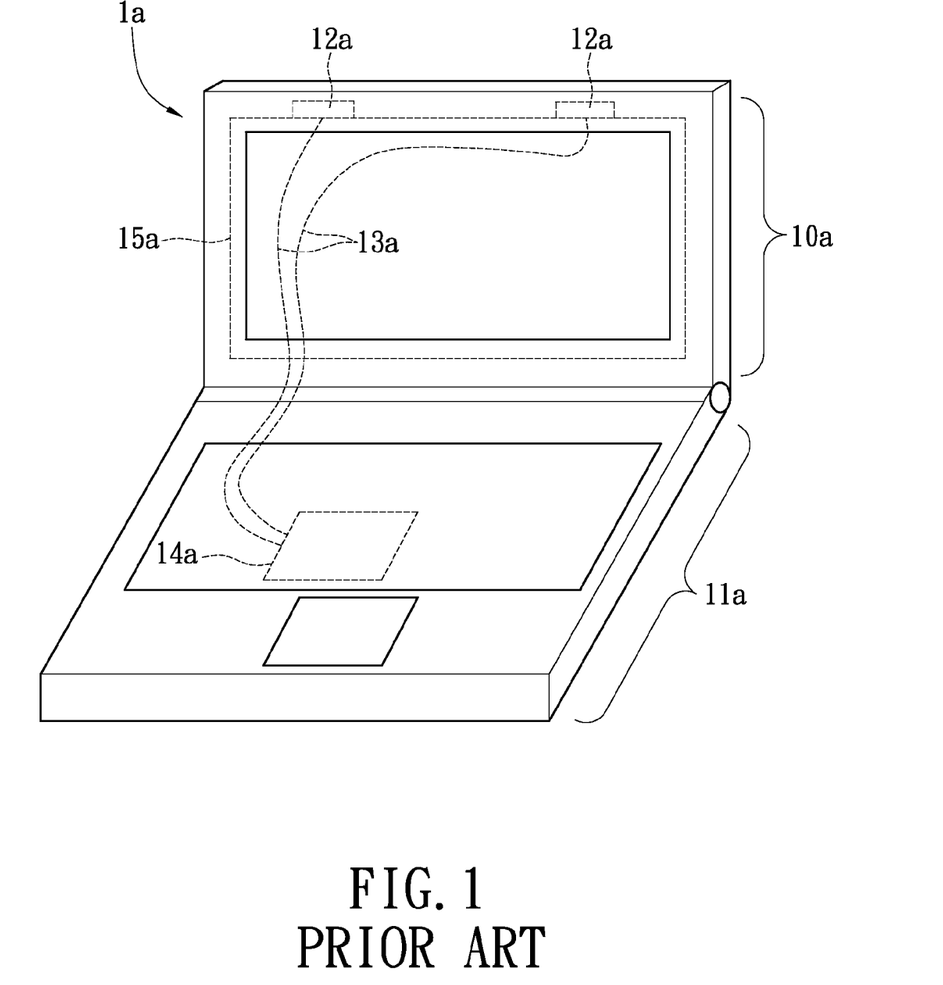
FIG. 1 shows a perspective, schematic view of the notebook computer equipped with a concealed antenna according to the related art.

Referring to FIG. 1, a schematic view of a conventional notebook computer equipped with a concealed antenna is shown. A notebook computer 1a generally includes a liquid crystal display (LCD) 10a and a base module 11a. Two concealed antennas 12a are symmetrically configured to the center of the upper edge of the LCD 10a to enhance the antenna diversity. An RF coaxial cable 13a is provided as a feed-in line of the antenna 12a so that the RF signals can be transmitted between the antenna 12a and the RF module 14a on the base module 11a. A sheet of shielding aluminum foil 15a is electrically coupled with the antenna 12a to improve the antenna radiation performance.

However, the above-mentioned structure of the antenna 12a equipped with the RF coaxial cable 13a for transmitting RF signals at least includes some disadvantages, for example, as follows:

1. Insertion loss: for a 100-centimeter-long high quality RF coaxial cable in the market, the insertion loss is 2.9 dB as the RF signal frequency is 2.4 GHz while the insertion loss is 4.7 dB as the RF signal frequency is 5 GHz. Generally, the length of a RF coaxial cable used in the notebook computer is about 20 cm to 90 cm. Therefore, the insertion loss is about 0.58 dB to 2.61 dB as the RF coaxial cable transmits a 2.4 GHz signal while the insertion loss goes up to 0.94 dB to 4.23 dB as the RF coaxial transmits a 5 GHz signal. Owing to the insertion loss, the antenna field pattern has to be concentrated to provide enough antenna gain for transmitting signals to a given distance. As a result, antenna radiation angles will be reduced and dead space in communication will be increased, which directly reduces communication quality.

2. Cost increase: according to the general estimation conducted by antenna manufacturing industry, the above-mentioned RF coaxial cable occupies about 50% of the antenna manufacturing cost. Moreover, as the wireless system is fabricated, additional devices, such as hooks for fixing the RF coaxial cable and fixing pieces for fixing the shielding aluminum foil, are required to fix the RF coaxial cable, which further increases the cost. The labor hours for configuring and positioning the RF coaxial cable will largely increase the fabrication cost.

SUMMARY OF THE INVENTION

One particular aspect of the instant disclosure is to provide a keyboard structure can generating antenna function without using long RF coaxial cable, thus the insertion loss and the manufacturing cost can be reduced.

To achieve the above-mentioned advantages, one embodiment of the instant disclosure provides a keyboard structure with antenna function, including a keyboard unit and an antenna unit. The keyboard unit includes a keyboard signal circuit board, at least one keyboard frame disposed on the keyboard signal circuit board, and a plurality of pressing elements movably disposed on the keyboard signal circuit board. The antenna unit includes at least one metal circuit disposed on the keyboard frame.

To achieve the above-mentioned advantages, one embodiment of the instant disclosure provides a keyboard structure with antenna function, including a keyboard unit and an antenna unit. The keyboard unit includes a keyboard signal circuit board, at least one keyboard frame disposed on the keyboard signal circuit board, and a plurality of pressing elements passing through the keyboard frame and movably disposed on the keyboard signal circuit board. The antenna unit includes at least one metal circuit disposed on the keyboard frame.

Therefore, because a wireless antenna module is usually disposed under the keyboard unit, when the metal circuit is formed on the keyboard frame, the distance between the metal circuit and the wireless antenna module is reduced comparing to the conventional antenna arrangement. In other words, because the length of a signal transmission line electrically connected between the metal circuit and the wireless antenna module can be substantially reduced, not only the insertion loss of the instant disclosure can be reduced to obtain better quality of wireless communication, but also the manufacturing cost and time of the instant disclosure also can be reduced effectively.

To further understand the techniques, means and effects the instant disclosure takes for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention that they be used for limiting the instant disclosure.

DETAILED DESCRIPTION OF THE PREFERRED EMBODIMENTS

Figure 2A:
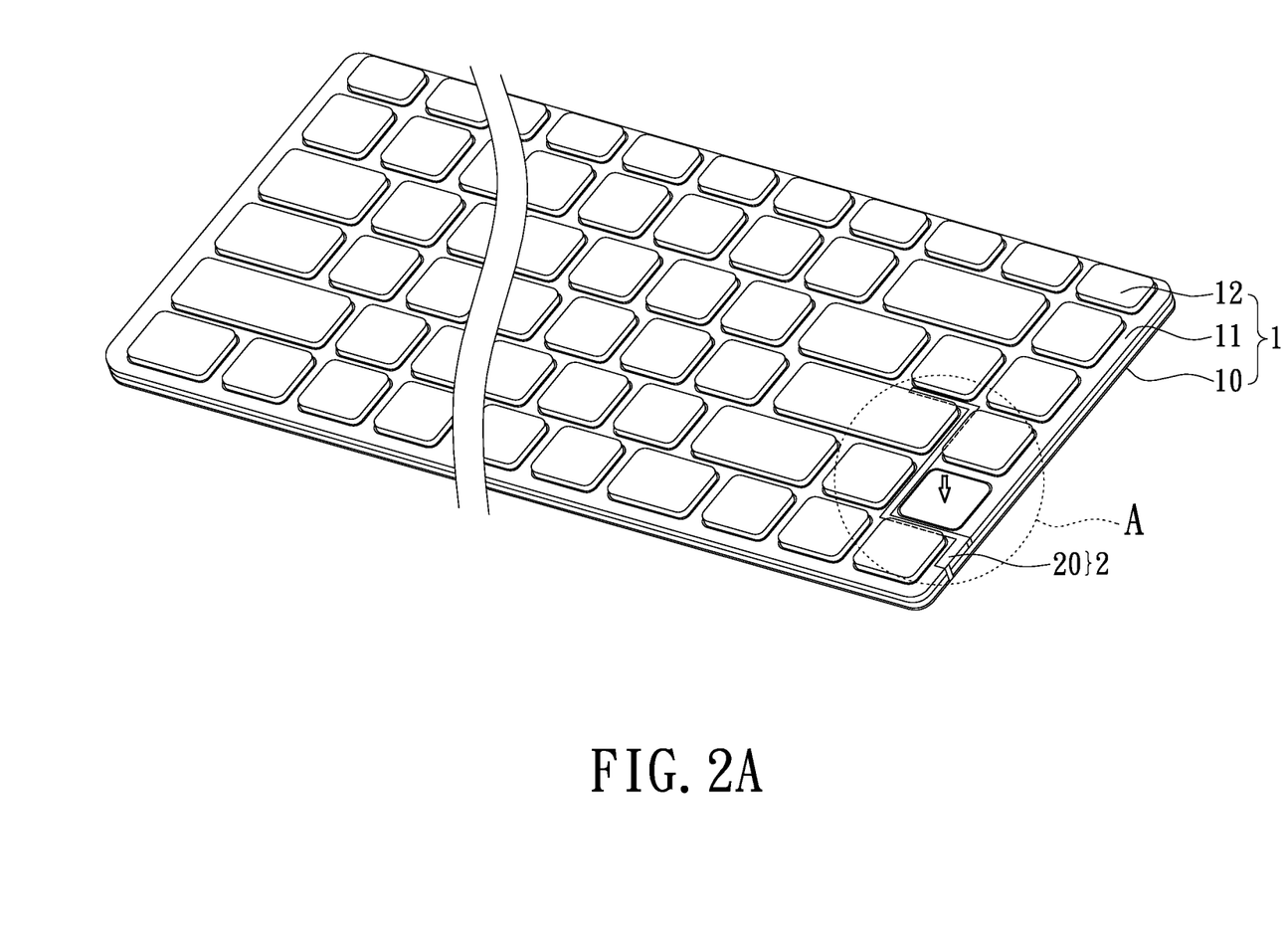
FIG. 2A shows a perspective, assembled, schematic view of the keyboard structure with antenna function according to the first embodiment of the instant disclosure.
Figure 2B:
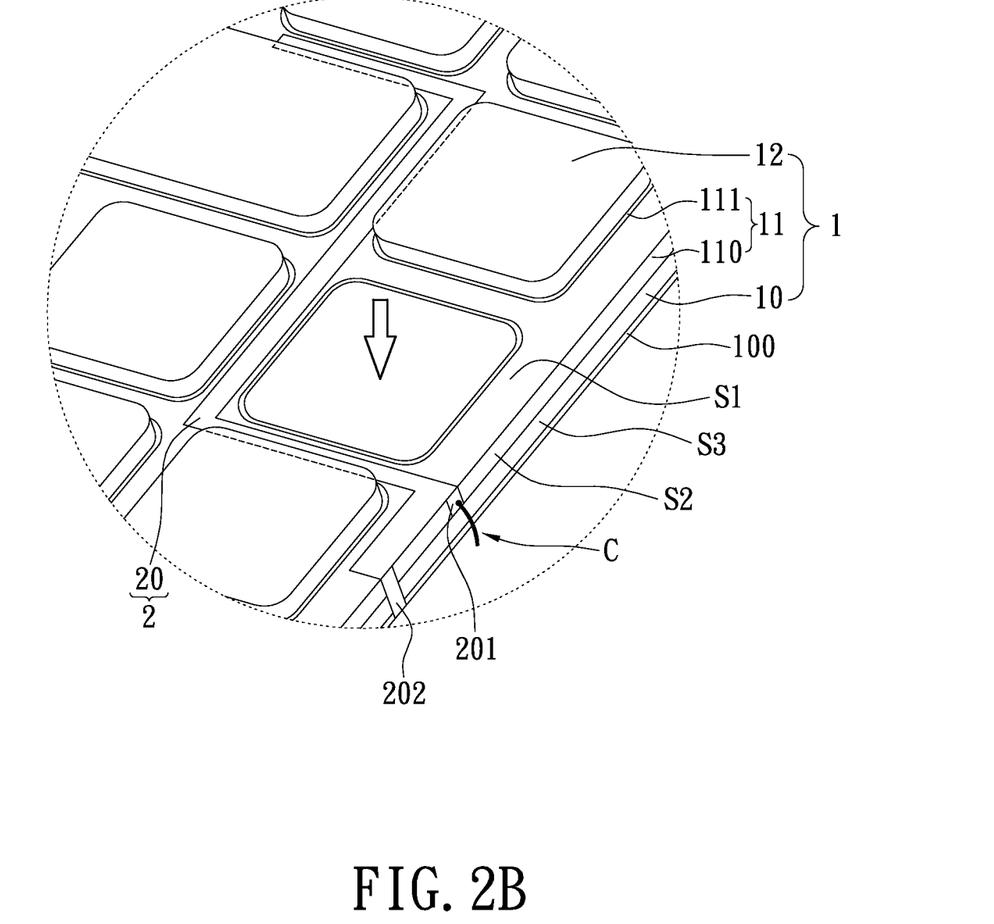
FIG. 2B shows an enlarged view of part A in FIG. 2A.
Figure 2C:
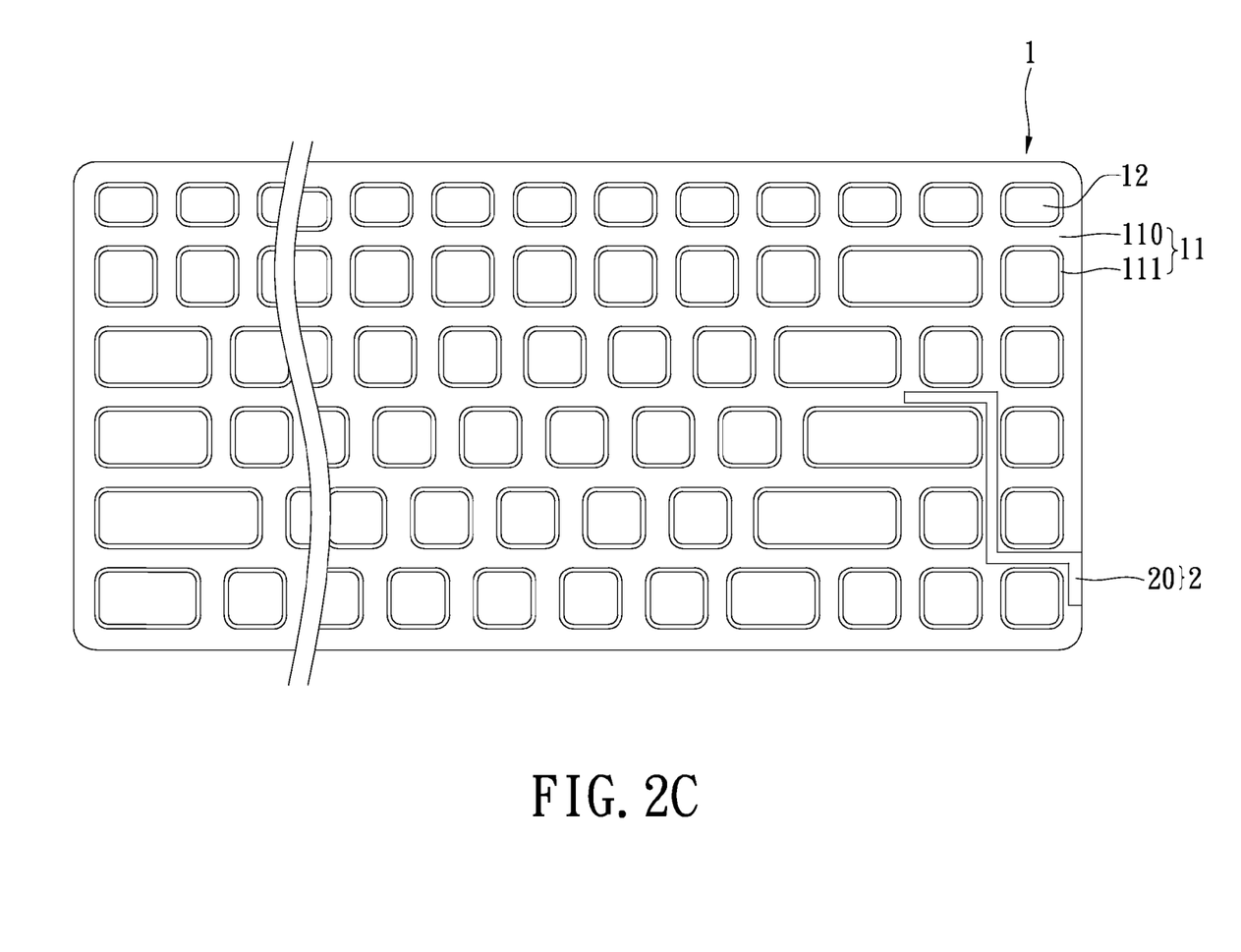
FIG. 2C shows a top, assembled, schematic view of the keyboard structure with antenna function according to the first embodiment of the instant disclosure.

Referring to FIGS. 2A to 2D, where FIG. 2B is an enlarged view of part A in FIG. 2A. The first embodiment of the instant disclosure provides a keyboard structure with antenna function, including: a keyboard unit 1 and an antenna unit 2, and the keyboard unit 1 may be any type of keyboard.

Figure 2D:
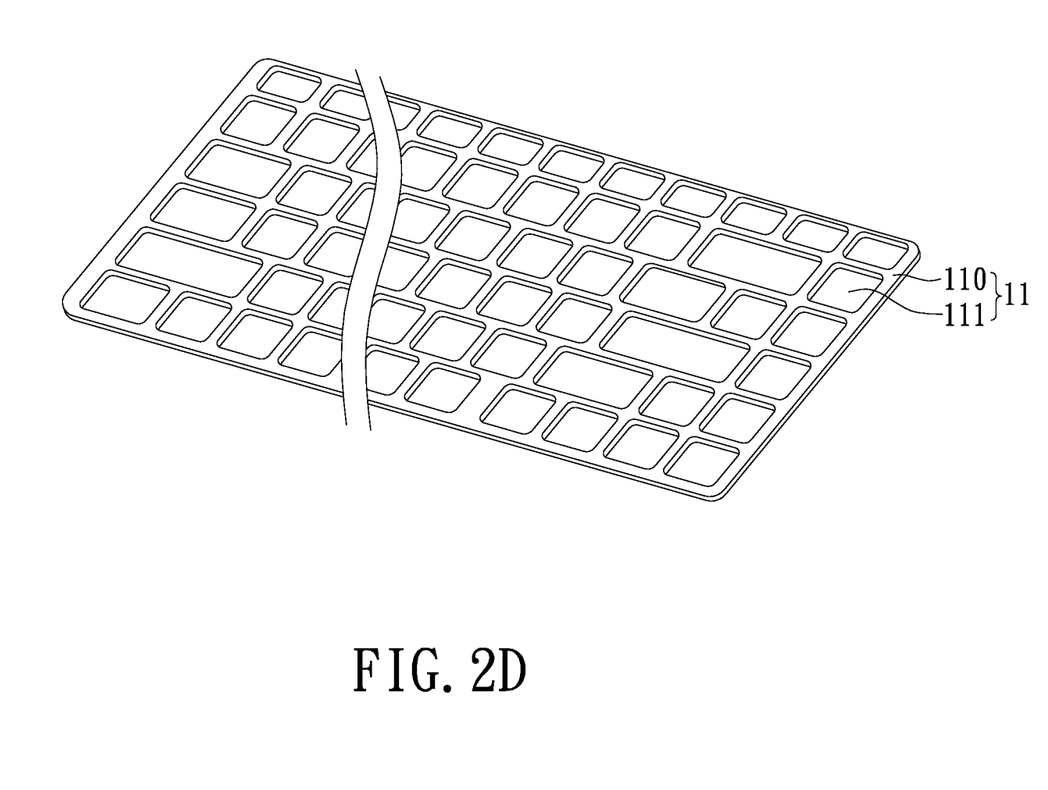
FIG. 2D shows a perspective, schematic view of the keyboard frame of the keyboard structure with antenna function according to the first embodiment of the instant disclosure.

The keyboard unit 1 includes a keyboard signal circuit board 10, at least one keyboard frame 11 disposed on the keyboard signal circuit board 10, and a plurality of pressing elements 12 (such as keycaps) passing through the keyboard frame 11 and movably (or operably) disposed on the keyboard signal circuit board 10. The keyboard signal circuit board 10 has a plurality of signal conducting pads (not shown) thereon, and the keyboard frame 11 includes a frame body 110 having a plurality of through holes 111 passing through the frame body 110 (as shown in FIGS. 2B and 2D). In addition, the pressing elements 12 respectively correspond to the through holes 111 and the corresponding signal conducting pads (not shown) of the keyboard signal circuit board 10. Each pressing element 12 can be moved upwardly and downwardly relative to each corresponding through hole 111. For example, when one pressing element 12 is pressed downwardly (shown as the direction of the arrow in FIGS. 2A and 2B) by a user, the pressing element 12 is moved from a top position above the through hole 111 to a bottom position inside the through hole 111, which the top surface of the pressing element 12 reaches toward the top surface S1 of the frame body 110 due to an operator's depression of the pressing element 12. At the same time, a conductive element (not shown) inside the pressing element 12 contacts the signal conducting pad (not shown) of the keyboard signal circuit board 10 to send out a keyboard signal. When the user releases the pressing element 12, the pressing element 12 would return to the original position above the top surface of the through hole 111 through an elastic member (not shown) arranged under the pressing element 12.

The antenna unit 2 includes at least one metal circuit 20 disposed on the keyboard frame 10. For example, the metal circuit 20 can be disposed on the top surface S1 of the frame body 110, and the metal circuit 20 has a predetermined antenna shape adapted to a predetermined antenna operation frequency. In addition, the metal circuit 20 has a feeding portion 201 and a grounding portion 202 (as shown in FIG. 2B), and both the feeding portion 201 and the grounding portion 202 are formed on an end of the metal circuit 20. The feeding portion 201 and the grounding portion 202 are extended downwardly along an external surface S2 of the frame body 110. The feeding portion 201 can be connected electrically to a wireless antenna module (not shown) through a signal transmission line C. Hence, when the wireless antenna module is built into a portable electronic device (not shown), the portable electronic device can receive and transmit wireless signals through the antenna unit 2. Moreover, the grounding portion 202 not only can be extended downwardly along the external surface S2 of the frame body 110, but also can be extended downwardly along the external surface S3 of the keyboard signal circuit board 10. In other words, because the keyboard signal circuit board 10 includes a grounding layer 100 disposed on a bottom side thereof, when the grounding portion 202 is extended downwardly along the external surface S2 of the frame body 110 and the external surface S3 of the keyboard signal circuit board 10, the grounding portion 202 can contact the grounding layer 100 directly to achieve grounding effect.

Figure 3:
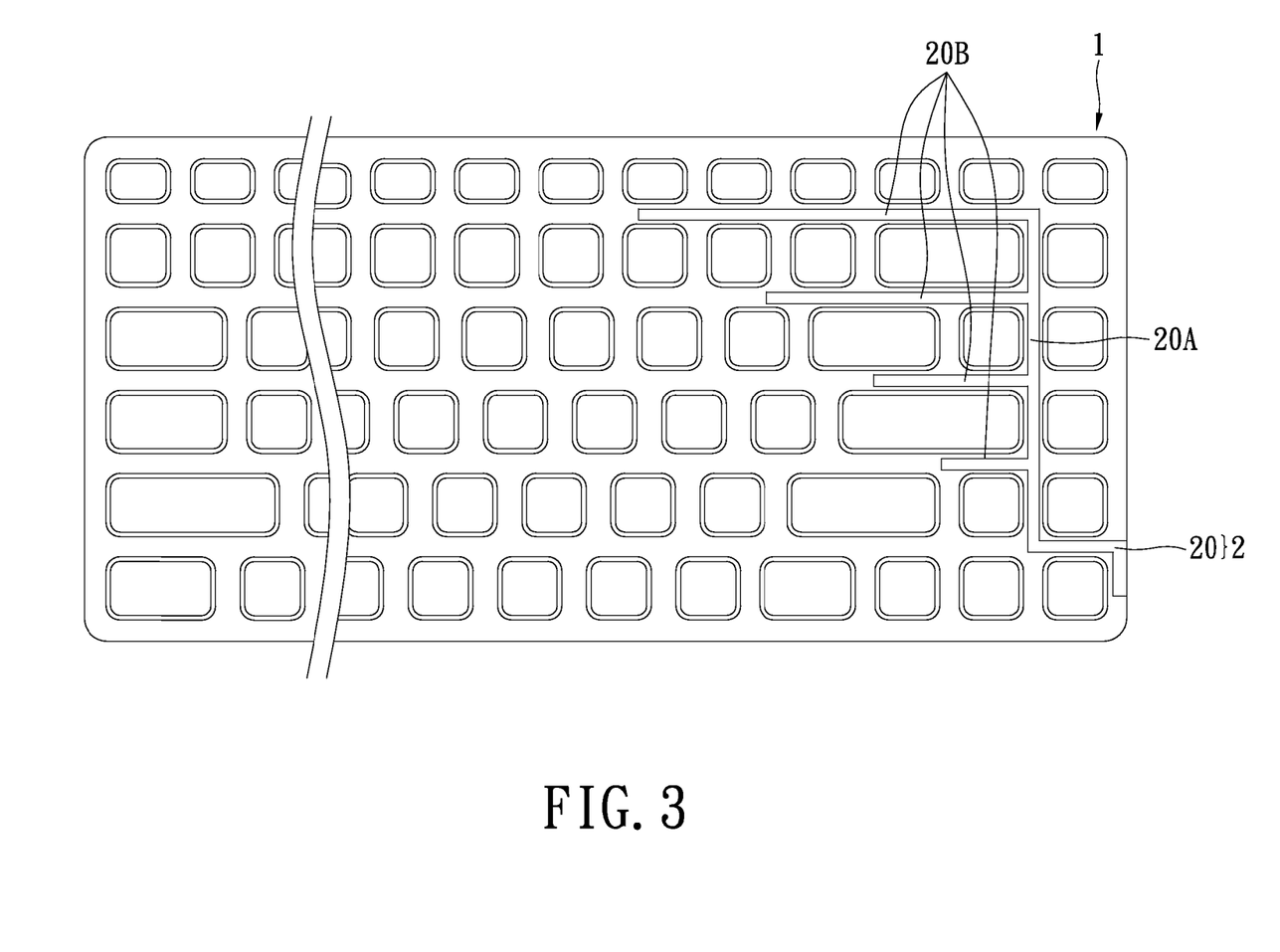
FIG. 3 shows a top, assembled, schematic view of the keyboard structure with antenna function according to the second embodiment of the instant disclosure.

Referring to FIG. 3, where the second embodiment of the instant disclosure provides a keyboard structure with antenna function, including: a keyboard unit 1 and an antenna unit 2. Comparing FIG. 3 with FIG. 2D, the difference between the second embodiment and the first embodiment is that: in the second embodiment, the metal circuit 20 has a main circuit 20A and a plurality of branch circuits 20B connected vertically to the main circuit 20A and extended toward the same direction. The branch circuits 20B are separated from each other by a predetermined distance, and the lengths of the branch circuits 20B can be increased or decreased progressively in sequence, thus the metal circuit 20 can be formed as a comb shape. In other words, the antenna pattern of the instant disclosure presented by the metal circuit 20 can be adjusted according to different antenna operation frequencies.

Figure 4:
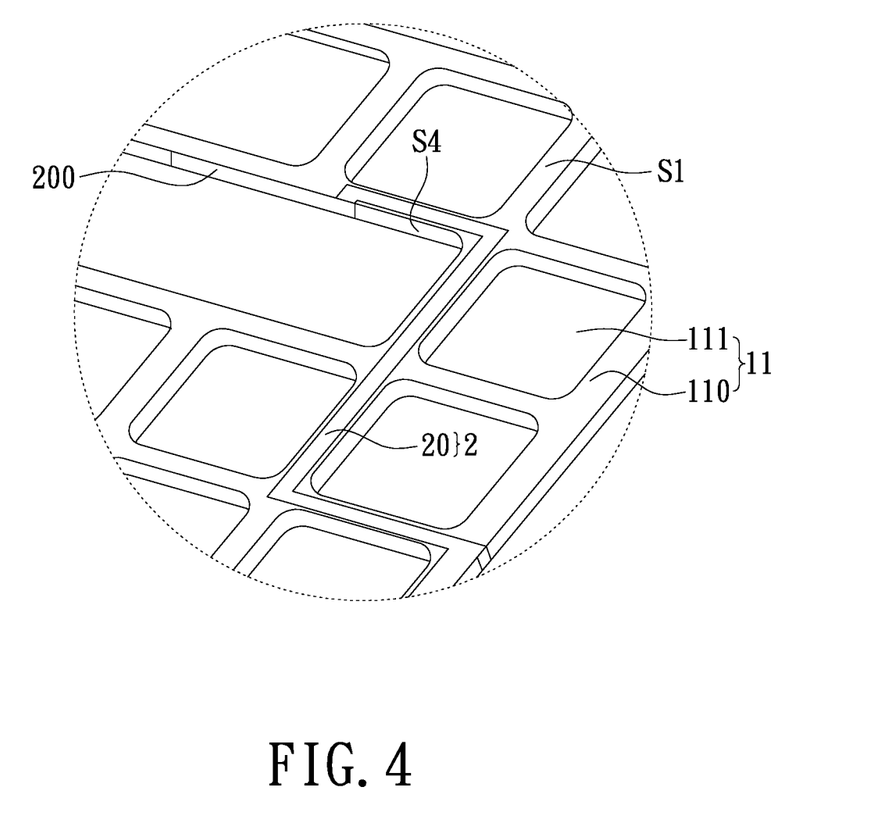
FIG. 4 shows a partial, perspective, schematic view of the keyboard frame of the keyboard structure with antenna function according to the third embodiment of the instant disclosure.

Referring to FIG. 4, where the third embodiment of the instant disclosure provides a keyboard structure with antenna function, including: a keyboard unit 1 and an antenna unit 2. Comparing FIG. 4 with FIG. 2B, the difference between the third embodiment and the first embodiment is that: in the third embodiment, the metal circuit 20 can be disposed on the top surface S1 of the frame body 110 and the inner surfaces S4 of the through holes 111 at the same time. In other words, not only the metal circuit 20 can be disposed on the top surface S1 of the frame body 110 to form different antenna patterns for adapting to different antenna operation frequencies, but also the partial track 200 of the metal circuit 20 can be disposed on the inner surfaces S4 of the through holes 111 according to different requirements.

However, the layout of the metal circuit 20 in the first, the second or the third embodiments is just an example and not to limit the instant disclosure. Hence, the metal circuit 20 disposed on any position of the surface of the keyboard frame 11 to form an antenna pattern with any shape is protected in the instant disclosure.

Figure 5:
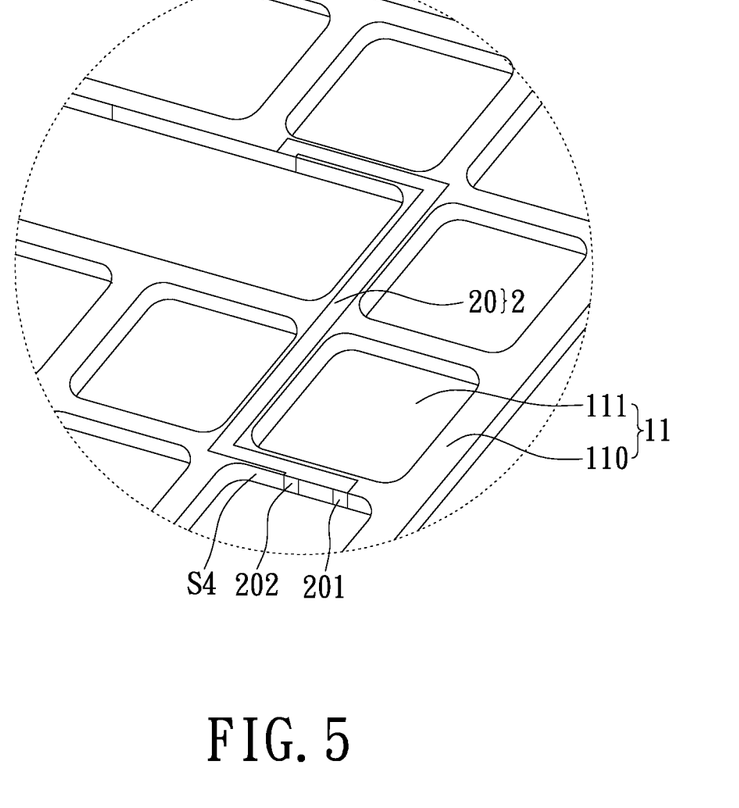
FIG. 5 shows a partial, perspective, schematic view of the keyboard frame of the keyboard structure with antenna function according to the fourth embodiment of the instant disclosure.

Referring to FIG. 5, where the fourth embodiment of the instant disclosure provides a keyboard structure with antenna function, including: a keyboard unit (not shown) and an antenna unit 2. Comparing FIG. 5 with FIG. 4, the difference between the fourth embodiment and the third embodiment is that: in the fourth embodiment, both the feeding portion 201 and the grounding portion 202 are extended downwardly along the inner surface S4 of one of the through holes 111. In addition, the feeding portion 201 can be connected electrically to a wireless antenna module (not shown) through a signal transmission line (not shown). Hence, when the wireless antenna module is built into a portable electronic device (not shown), the portable electronic device can receive and transmit wireless signals through the antenna unit 2. Moreover, the grounding portion 202 can be extended downwardly along the inner surface S4 of one of the through holes 111 to contact directly the grounding layer (not shown) for achieving grounding effect. Of course, the method for extending the feeding portion 201 and the grounding portion 202 in the first embodiment can be replaced by the method of extending the feeding portion 201 and the grounding portion 202 in the fourth embodiment.

Figure 6:
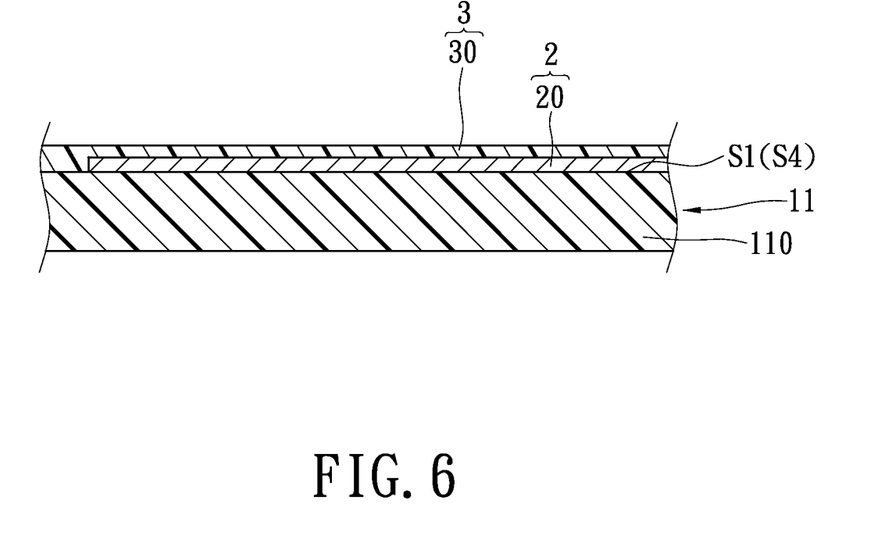
FIG. 6 shows a lateral, cross-sectional, schematic view of the keyboard structure with antenna function according to one embodiment of the instant disclosure.

Referring to FIG. 6, the keyboard structure of the instant disclosure further comprises a shading unit 3 including a shading layer 30. The shading layer 30 can be disposed on a top surface S1 of the frame body 110 for shading the metal circuit 20, and this shading layer 30 can be adapted to the first embodiment. Alternatively, the shading layer 30 also can be disposed on the top surface S1 of the frame body 110 and the inner surfaces S4 of the through holes (not shown) for shading the metal circuit 20, and this shading layer 30 can be adapted to the third embodiment.

Figure 7A:
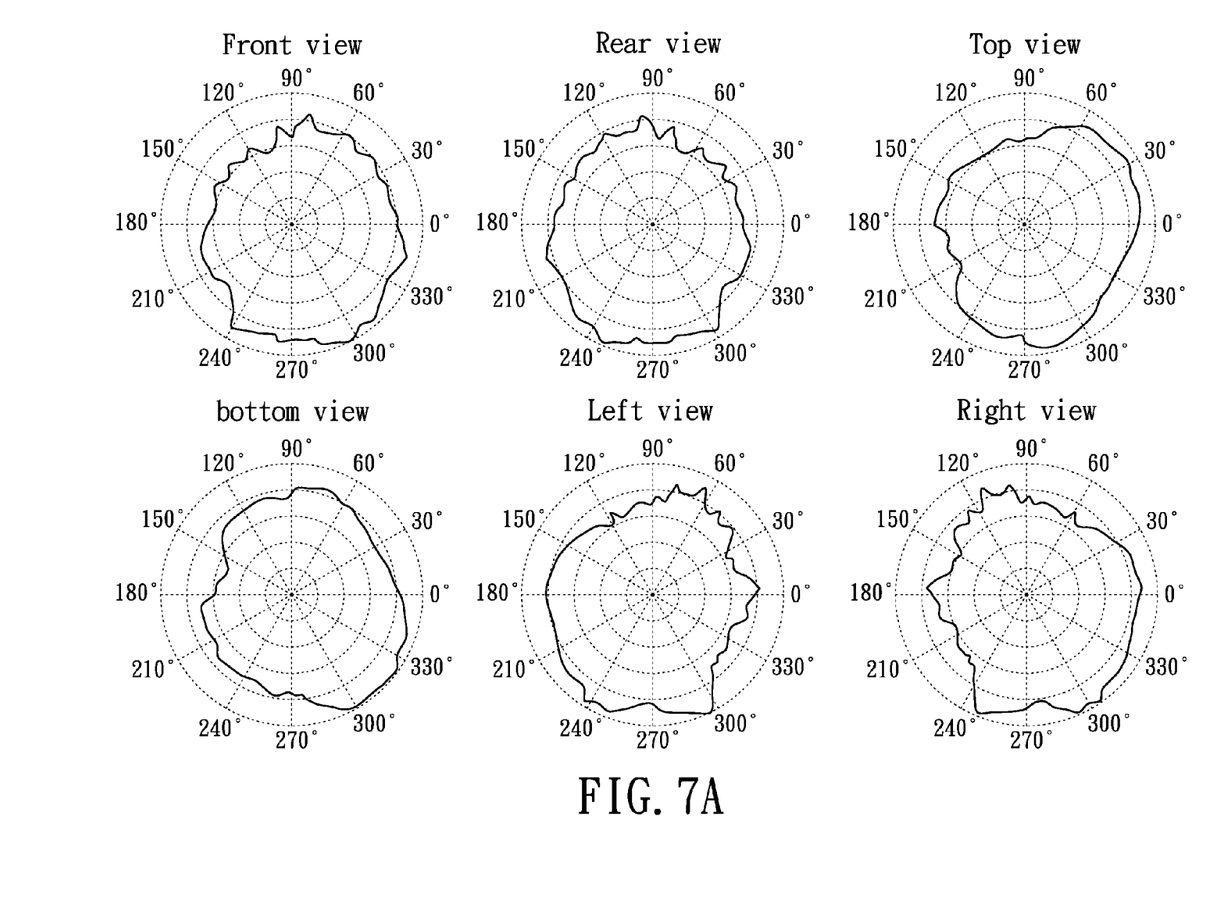
FIG. 7A shows six radiation patterns (including front, rear, top, bottom, left and right views) of the antenna unit of the keyboard structure at 2400 MHz in six different planes according to one embodiment of the instant disclosure.

Referring to FIG. 7A, where six radiation patterns (including front, rear, top, bottom, left and right views) of the antenna unit of the keyboard structure at 2400 MHz in six different planes according to one embodiment of the instant disclosure are shown. When the antenna unit 2 is adapted to the keyboard unit 1 and operated at 2400 MHz, the keyboard structure can provides a better and useful antenna pattern.

Figure 7B:
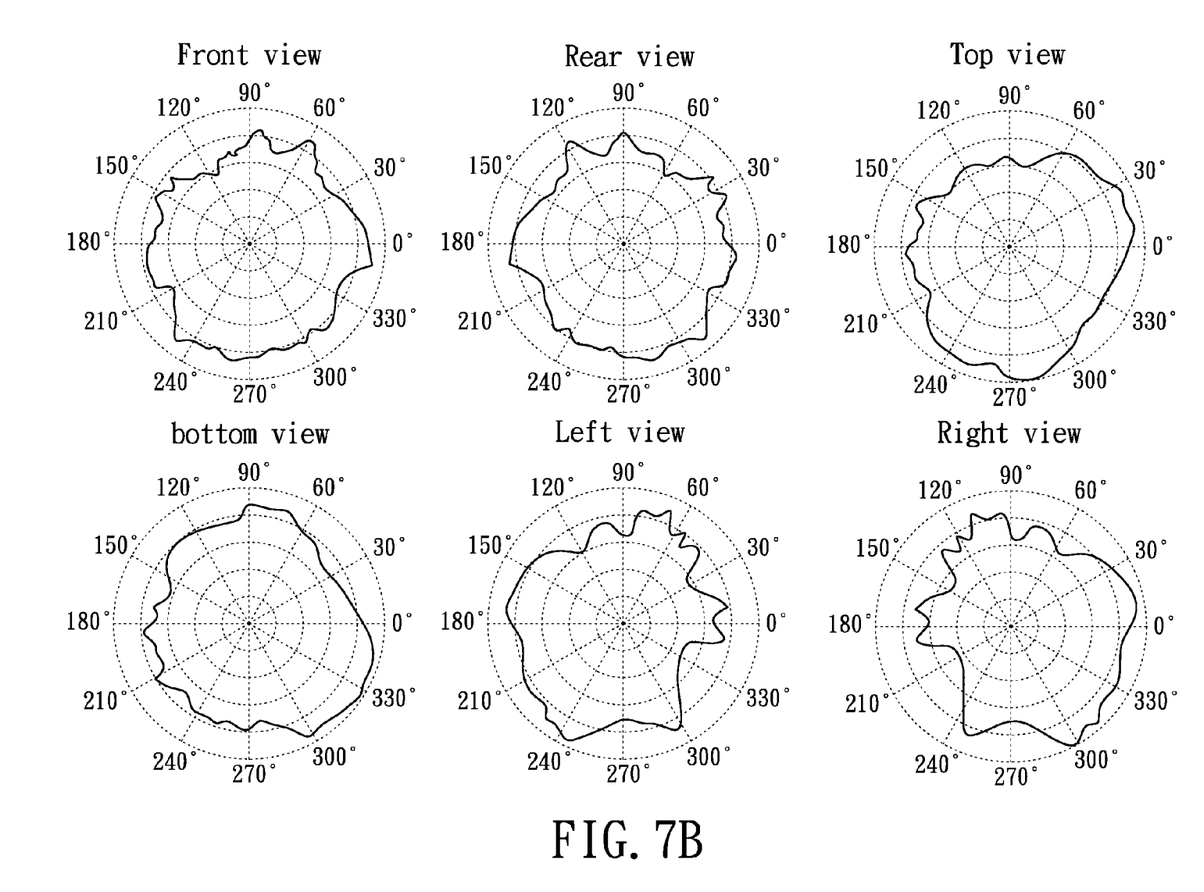
FIG. 7B shows six radiation patterns (including front, rear, top, bottom, left and right views) of the antenna unit of the keyboard structure at 2450 MHz in six different planes according to one embodiment of the instant disclosure.

Referring to FIG. 7B, where six radiation patterns (including front, rear, top, bottom, left and right views) of the antenna unit of the keyboard structure at 2450 MHz in six different planes according to one embodiment of the instant disclosure are shown. When the antenna unit 2 is adapted to the keyboard unit 1 and operated at 2450 MHz, the keyboard structure can provides a better and useful antenna pattern.

Figure 7C:
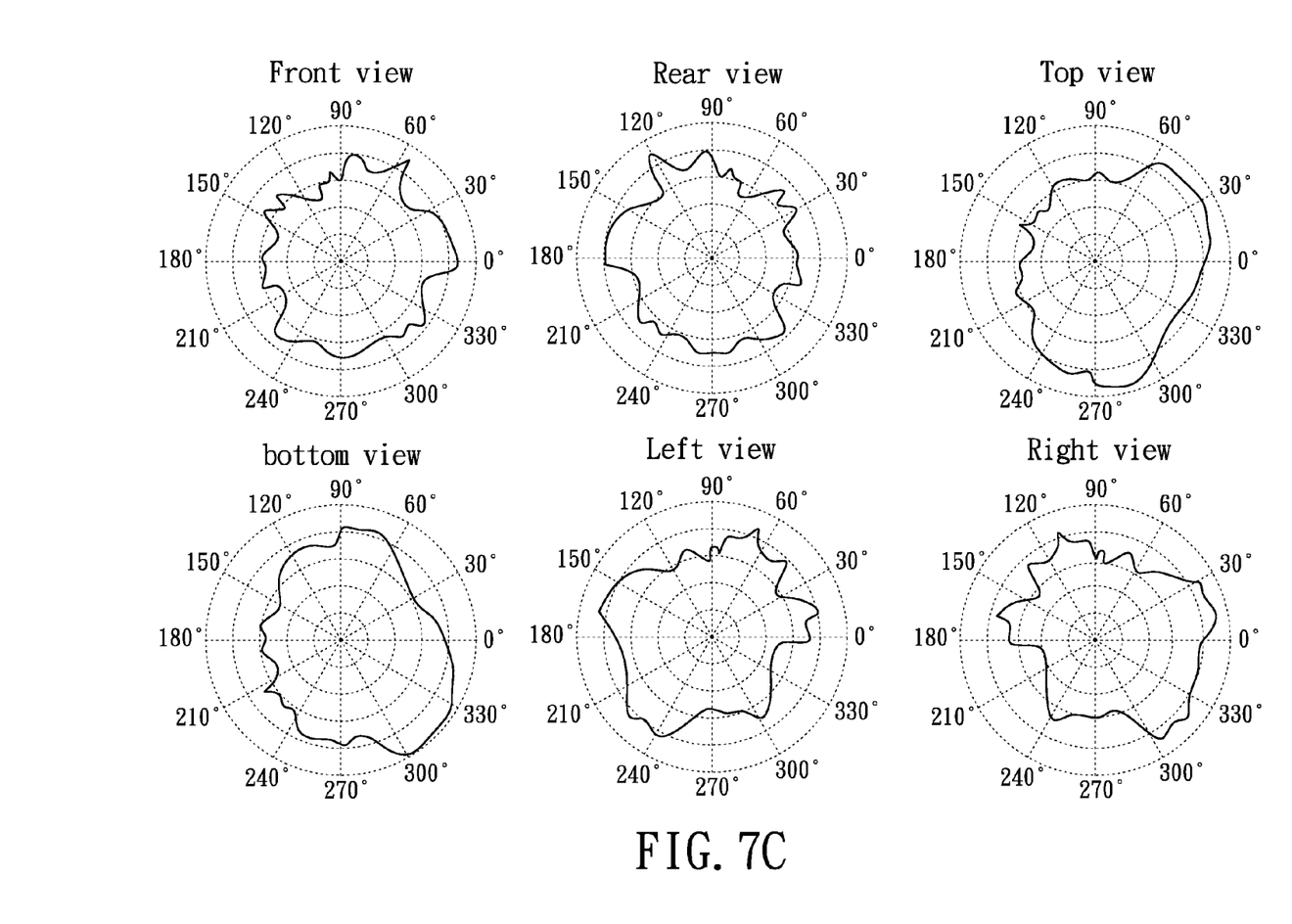
FIG. 7C shows six radiation patterns (including front, rear, top, bottom, left and right views) of the antenna unit of the keyboard structure at 2500 MHz in six different planes according to one embodiment of the instant disclosure.

Referring to FIG. 7C, where six radiation patterns (including front, rear, top, bottom, left and right views) of the antenna unit of the keyboard structure at 2500 MHz in six different planes according to one embodiment of the instant disclosure are shown. When the antenna unit 2 is adapted to the keyboard unit 1 and operated at 2500 MHz, the keyboard structure can provides a better and useful antenna pattern.

Figure 8:
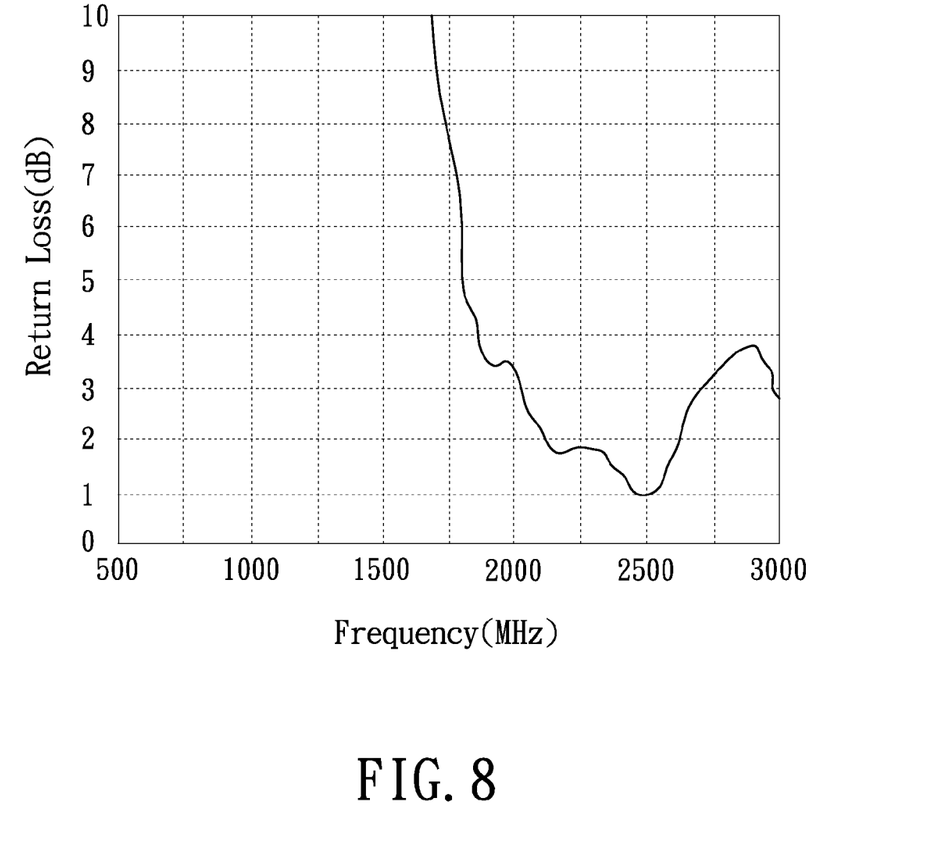
FIG. 8 shows a return loss diagram of the antenna unit of the keyboard structure at 2450 MHz according to one embodiment of the instant disclosure is shown.

Referring to FIG. 8, where a return loss diagram of the antenna unit of the keyboard structure at 2450 MHz according to one embodiment of the instant disclosure is shown. When the antenna unit 2 is adapted to the keyboard unit 1 and operated at 2450 MHz, the keyboard structure can obtain 1.98 dB return loss for WLAN operation in the 2450 MHz band, thus the instant disclosure can obtain good impedance matching.

In conclusion, because a wireless antenna module is usually disposed under the keyboard unit, when the metal circuit is formed on the keyboard frame, the distance between the metal circuit and the wireless antenna module is reduced comparing to the conventional antenna arrangement. In other words, because the length of a signal transmission line electrically connected between the metal circuit and the wireless antenna module can be substantially reduced, not only the insertion loss of the instant disclosure can be reduced to obtain better quality of wireless communication, but also the manufacturing cost and time of the instant disclosure also can be reduced effectively.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A keyboard structure with antenna function, comprising:
   a keyboard unit including a keyboard signal circuit board, at least one keyboard frame disposed on the keyboard signal circuit board, and a plurality of pressing elements movably disposed on the keyboard signal circuit board, wherein the keyboard frame includes a frame body having a plurality of through holes passing through the frame body, and the pressing elements respectively fitly pass through the through holes of the frame body and are separated from each other by the frame body; and
   an antenna unit including at least one metal circuit disposed on the frame body;
   wherein the metal circuit has a feeding portion and a grounding portion formed on an end thereof, and the feeding portion and the grounding portion are extended downwardly along an external surface of the frame body and an inner surface of one of the through holes.

2. The keyboard structure of claim 1, wherein the metal circuit having a main circuit and a plurality of branch circuits connected vertically to the main circuit and extended toward the same direction, and the branch circuits are separated from each other by a predetermined distance.

3. The keyboard structure of claim 2, wherein the lengths of the branch circuits are increased or decreased progressively in sequence.

4. The keyboard structure of claim 1, further comprising: a shading unit including a shading layer disposed on a top surface of the frame body for shading the metal circuit.

5. The keyboard structure of claim 1, wherein the keyboard signal circuit board includes a grounding layer disposed on a bottom side thereof, and the grounding portion of the metal circuit contacts the grounding layer.

6. The keyboard structure of claim 1, wherein the metal circuit is disposed on a top surface of the frame body and inner surfaces of the through holes.

7. The keyboard structure of claim 6, further comprising: a shading unit including a shading layer disposed on the top surface of the frame body and the inner surfaces of the through holes for shading the metal circuit.

8. A keyboard structure, comprising:
   a keyboard signal circuit board;
   a frame body disposed on the keyboard signal circuit board, wherein the frame body has a plurality of through holes passing therethrough;
   a plurality of keycaps separated from each other and respectively passing through the through holes of the frame body;
   an antenna unit including at least one metal pattern disposed on the frame body and separated from the keycaps for receiving and transmitting wireless signals without passing through the keycaps, wherein the shape of the at least one metal pattern is different from that of the frame body;
   wherein the metal circuit has a feeding portion and a grounding portion formed on an end thereof, and the feeding portion and the grounding portion are extended downwardly along an external surface of the frame body and an inner surface of one of the through holes.

* * * * *